United States Patent
Wentink

(10) Patent No.: US 8,681,612 B2
(45) Date of Patent: Mar. 25, 2014

(54) METHODS AND DEVICES TO IMPLEMENT A REDUCED CONTENTION PERIOD TO FACILITATE CHANNEL ACCESS FOR ACCESS TERMINALS OPERATING IN A WIRELESS COMMUNICATION ENVIRONMENT

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 12/899,689

(22) Filed: Oct. 7, 2010

(65) Prior Publication Data

US 2012/0087355 A1 Apr. 12, 2012

(51) Int. Cl.
*H04W 72/12* (2009.01)
*H04W 74/00* (2009.01)

(52) U.S. Cl.
CPC .............. *H04W 74/006* (2013.01); *H04W 72/12* (2013.01)
USPC ........... 370/230; 370/229; 370/235; 370/310; 370/312; 370/313; 370/338

(58) Field of Classification Search
USPC .......... 370/229, 230, 235, 310, 312, 313, 338
See application file for complete search history.

(56) References Cited

U.S. PATENT DOCUMENTS

| | | | |
|---|---|---|---|
| 7,706,397 B2 * | 4/2010 | Trainin et al. | 370/445 |
| 2006/0187840 A1 * | 8/2006 | Cuffaro et al. | 370/235 |
| 2006/0187964 A1 | 8/2006 | Li et al. | |
| 2007/0002814 A1 | 1/2007 | Benveniste | |
| 2010/0220699 A1 | 9/2010 | Gopalakrishnan | |
| 2011/0142022 A1 * | 6/2011 | Kubo et al. | 370/338 |
| 2011/0305217 A1 * | 12/2011 | Seok | 370/329 |

FOREIGN PATENT DOCUMENTS

| | | |
|---|---|---|
| EP | 2037718 A2 | 3/2009 |
| WO | WO 2010021109 A1 * | 2/2010 |

OTHER PUBLICATIONS

Newton, Harry "Newton's Telecom Dictionary" 23rd Edition, 2007. p. 548.*
International Search Report and Written Opinion—PCT/US2011/055416—ISA/EPO—Apr. 25, 2012.

* cited by examiner

*Primary Examiner* — Dang T Ton
*Assistant Examiner* — Robert M Morlan
(74) *Attorney, Agent, or Firm* — Kevin T. Cheatham

(57) ABSTRACT

Methods and apparatuses are provided for implementing a reduced contention period to facilitate channel access for access terminals. An access point may send a frame to a plurality of access terminals specifying a time period during which at least some of the access terminals are to stop transmitting on a shared transmission channel. The access terminals may receive the transmission and may stop transmitting on the shared transmission channel for the specified time period.

82 Claims, 10 Drawing Sheets

METHODS AND DEVICES TO IMPLEMENT A REDUCED CONTENTION PERIOD TO FACILITATE CHANNEL ACCESS FOR ACCESS TERMINALS OPERATING IN A WIRELESS COMMUNICATION ENVIRONMENT

BACKGROUND

1. Field

Various features disclosed herein pertain generally to wireless communication systems, and at least some features pertain to devices and methods for implementing a reduced contention period to facilitate channel access for access terminals operating in a wireless communication system.

2. Background

Access terminals, such as laptop computers, personal digital assistant devices, mobile or cellular phones, personal media players, or any other device with a processor, that communicate with other devices through wireless signals are becoming increasingly popular and are used more frequently. Such increases in distribution and use of access terminals have resulted in the need for greater bandwidth.

In order to address the issue of increasing bandwidth demands, different schemes are being developed to allow multiple access terminals to communicate by sharing channel resources while achieving high data throughputs. Such schemes are being, or have been adopted by several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

As these schemes evolve for improving support for communications with multiple users, it may occur that some new features may not work with certain access terminals that are not adapted to implement one or more features of such schemes. These access terminals may be characterized as "legacy" access terminals. In addition, various features may require further adaptations to improve availability to multiple access terminals.

For example, one or more of these schemes for improving support for multiple-access communications include employing an access point (e.g., base station, etc.) to manage channel access among a plurality of associated access terminals (e.g., access terminals actively registered with a particular access point) by assigning transmit opportunities based on some form of priority. However, such priority-based channel access for associated access terminals may limit the ability for legacy access terminals and/or non-associated access terminals to access the transmission channel. This is especially true in high traffic scenarios where it is even more difficult for a legacy and/or non-associated access terminal to get a transmission opportunity amid an already high traffic load.

SUMMARY

Providing channel access for some access terminals operating in a wireless communications environment is facilitated by introducing a temporary period of reduced contention on a transmission medium.

One feature provides access terminals adapted to facilitate a temporary period of reduced contention on a shared transmission channel. Such access terminals may include a communications interface adapted to facilitate wireless communications. The communications interface may be adapted to facilitate wireless communications in an Institute of Electrical and Electronics Engineers (IEEE) 802.11 wireless local area network (WLAN).

A processing circuit may be coupled to the communications interface, and adapted to receive a first transmission via the communications interface. The first transmission can include a first frame that specifies a time period during which the access terminal is to refrain from transmitting on the shared transmission channel, where the time period coincides with an interval during which one or more other access terminals are instructed to also refrain from transmitting on the shared transmission channel. The first frame may specify the time period by instructing the access terminal to set a network allocation vector (NAV) for the specified time period, set a backoff for the specified time period, add a fixed value to a backoff to equal the specified time period, or set an arbitration interframe space (AIFS) to a value equal to the specified time period.

When the first frame specifies the time period by instructing the access terminal to set a network allocation vector (NAV), the processing circuit may be further adapted to set the network allocation vector (NAV) for the specified time period to stop transmitting on the shared transmission channel upon receipt of the first frame. The first frame can include a network allocation vector (NAV) for associated access terminals field (NAT field) specifying the time period for the network allocation vector (NAV), and indicating that the network allocation vector (NAV) is to be set only at associated access terminals. In some examples, the first frame may comprise a media access control (MAC) header, and the NAT field may be included as a field in the media access control (MAC) header, and a presence of the NAT field may be indicated by a high throughput control (HTC) field in the media access control (MAC) header. In other examples, the first frame may comprise an action frame including a category field indicating that the action frame is of a category that includes the NAT field.

The processing circuit may further be adapted to stop transmitting on the shared transmission channel for the specified time period upon receipt of the first transmission.

A method operational in an access terminal is also provided. For instance, a first frame may be received that specifies a time period during which the access terminal is to refrain from transmitting on a shared transmission channel. The time period may coincide with an interval during which one or more other access terminals are also instructed to refrain from transmitting on the shared transmission channel. Transmissions may subsequently be stopped by the access terminal on the shared transmission channel for the specified time period after receiving the first frame.

An additional feature provides another access terminal including a communications interface adapted to facilitate wireless communications. The communications interface may be adapted to facilitate wireless communications in an Institute of Electrical and Electronics Engineers (IEEE) 802.11 wireless local area network (WLAN). A processing circuit is coupled to the communications interface and adapted to receive a first frame via the communications interface. The first frame may specify a time period during which the access terminal is to refrain from transmitting on a shared transmission channel, where the time period coincides with an interval during which one or more other access terminals are instructed to also refrain from transmitting on the shared transmission channel. For example, the first frame may instruct the access terminal to set a network allocation vector (NAV) for the specified time period, and the processing circuit may be adapted to set the network allocation vector (NAV).

The processing circuit may further receive a partial-reset frame via the communications interface before the expiration of the specified time period. The partial-reset frame can indicate that the access terminal is allowed to transmit at least one type of transmission frame on the shared transmission channel during the specified time period. The partial-reset frame may be adapted to instruct the access terminal to partially reset a network allocation vector (NAV) to allow transmissions of the at least one type of transmission frame during the specified time period, whereupon the processing circuit may partially reset the network allocation vector (NAV). The first frame and the partial-reset frame can comprise a single integrated transmission frame adapted to instruct the access terminal to both set and partially reset the network allocation vector (NAV). The at least one type of transmission frame that the access terminal is allowed to transmit on the shared transmission channel during the specified time period can include at least one of a probe request frame, an authentication request frame, or an association request frame.

The processing circuit may further be adapted to send, via the communications interface, only an allowed type of transmission frame on the shared transmission channel during the specified time period.

A method operational in an access terminal is also provided, where a first transmission may be received that includes a first frame specifying a time period during which the access terminal is to refrain from transmitting on a shared transmission channel. The time period may coincide with an interval during which one or more other access terminals are also instructed to refrain from transmitting on the shared transmission channel. A partial-reset frame may also be received before the expiration of the specified time period. The partial-reset frame may indicate that the access terminal is allowed to transmit at least one type of transmission frame on the shared transmission channel during the specified time period. The method may further include sending only an allowed type of transmission frame on the shared transmission channel during the specified time period.

Another feature provides access points adapted to facilitate a temporary period of reduced contention on a shared transmission channel. Such access points may include a communications interface adapted to facilitate wireless communications. The communications interface may be adapted to facilitate wireless communications in an Institute of Electrical and Electronics Engineers (IEEE) 802.11 wireless local area network (WLAN).

A processing circuit may be coupled to the communications interface, and adapted to wirelessly transmit a first frame via the communications interface to a plurality of access terminals. The first frame may specify a time period during which at least some of the plurality of access terminals are to stop transmitting on a shared transmission channel. For example, the first frame may instruct at least some of the plurality of access terminals to set a network allocation vector (NAV) for the specified time period, set a backoff for the specified time period, add a fixed value to a backoff so the combination equals the specified time period, or set an arbitration interframe space (AIFS) to a value equal to the specified time period.

Where the first frame is adapted to set a network allocation vector (NAV) for a duration of the specified time period, the first frame may include a network allocation vector (NAV) for associated access terminals field (NAT field). The NAT field may specify the time period for the network allocation vector (NAV) and may indicate that the network allocation vector (NAV) is to be set only at associated access terminals. For example, the first frame may comprise a media access control (MAC) header with the NAT field included as a field in the media access control (MAC) header, and a presence of the NAT field is indicated by a high throughput control (HTC) field in the media access control (MAC) header. In another example, the first frame can comprise an action frame including a category field indicating that the action frame is of a category that includes the NAT field.

The processing circuit may be further adapted to receive, via the communications interface, a transmission during the specified time period from at least one of a non-associated access terminal not actively registered with the access point or a legacy access terminal In addition, the processing circuit may be adapted to wirelessly transmit a plurality of first frames via the communications interface to a plurality of access terminals, wherein each first frame of the plurality is wirelessly transmitted according to a periodic schedule.

A method operational in an access point is also provided according to a feature. For instance, a first frame may be wirelessly transmitted to a plurality of access terminals. The first frame may specify a time period during which at least some of the plurality of access terminals are to stop transmitting on a shared transmission channel. Furthermore, a transmission may be received during the specified time period from at least one access terminal of the plurality of access terminals, where the at least one access terminal comprises a non-associated access terminal not actively registered with the access point or a legacy access terminal.

An additional feature provides another access point including a communications interface adapted to facilitate wireless communications. The communications interface may be adapted to facilitate wireless communications in an Institute of Electrical and Electronics Engineers (IEEE) 802.11 wireless local area network (WLAN). A processing circuit is coupled to the communications interface and adapted to wirelessly transmit a first frame via the communications interface to a plurality of access terminals. The first frame can specify a time period during which the plurality of access terminals are to stop transmitting on a shared transmission channel. For example, the first frame may be adapted to instruct the plurality of access terminals to set a network allocation vector (NAV) for a duration of the specified time period.

The processing circuit may further be adapted to wirelessly transmit a partial-reset frame before the expiration of the specified time period. The partial-reset frame can indicate that the plurality of access terminals are allowed to transmit at least one type of transmission frame on the shared transmission channel during the specified time period. The partial-reset frame may be adapted to instruct the plurality of access terminals to partially reset a network allocation vector (NAV) to allow transmissions of the at least one type of transmission frame during the specified time period. The first frame and the partial-reset frame can comprise the same transmission frame that is adapted to both set and partially reset the network allocation vector (NAV). The at least one type of transmission frame that the access terminal is allowed to transmit on the shared transmission channel during the specified time period can include at least one of a probe request frame, an authentication request frame, or an association request frame.

The processing circuit may further receive, via the communications interface, at least one transmission during the specified time period, where the at least one transmission includes only an allowed type of transmission frame. Additionally, the processing circuit may be adapted to wirelessly transmit a plurality of sets via the communications interface to a plurality of access terminals. Each set may include a first frame and partial-reset frame, where each set is wirelessly transmitted according to a periodic schedule.

A method operational in an access point is also provided, where a first frame may be wirelessly transmitted to a plurality of access terminals. The first frame can specify a time period during which the plurality of access terminals are to stop transmitting on a shared transmission channel. A partial-reset frame may also be wirelessly transmitted before the expiration of the specified time period. The partial-reset frame may indicate that the plurality of access terminals are allowed to transmit at least one type of transmission frame on the shared transmission channel during the specified time period. Furthermore, at least one transmission may be received during the specified time period, where the at least one transmission includes only an allowed type of transmission frame.

DETAILED DESCRIPTION

Figure 1:
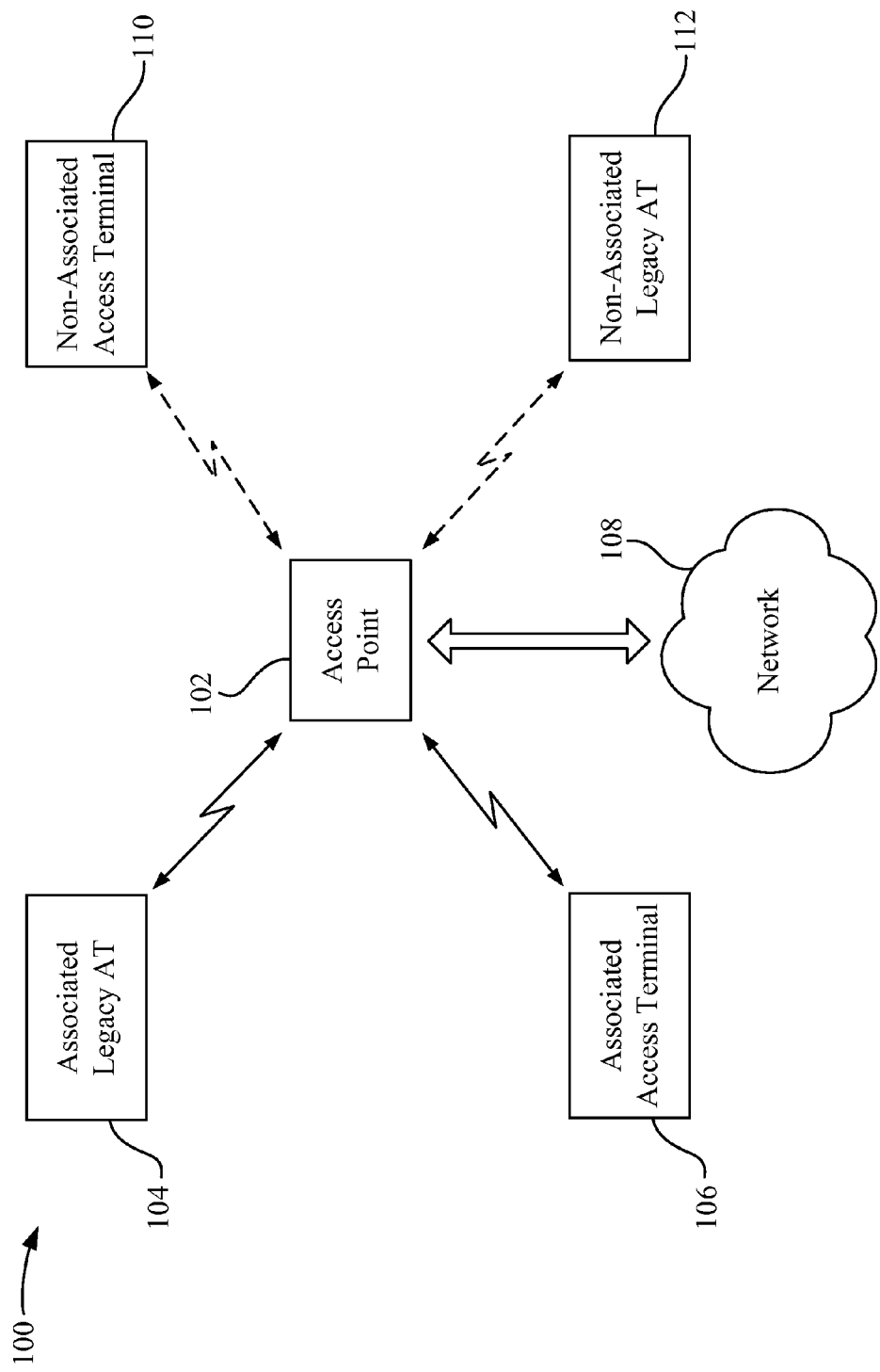
FIG. 1 is a block diagram illustrating how one or more access terminals may operate within a communication network.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation. The terms "access point" and "access terminal" as used herein are meant to be interpreted broadly. For example, an "access point" may refer to a device that facilitates wireless connectivity (for one or more access terminals) to a communication or data network. Examples of "access points" may include base stations, Node-B devices, femto cells, pico cells, etc. Furthermore, an "access terminal" may include mobile phones, pagers, wireless modems, personal digital assistants, personal information managers (PIMs), palmtop computers, laptop computers, and/or other mobile communication/computing devices which communicate, at least partially, through a wireless or cellular network.

Overview

One feature provides apparatuses and methods for facilitating channel access for one or more legacy access terminals and/or access terminals not actively associated with an access point by temporarily reducing contention on the transmission medium.

According to a feature, an access point may send a transmission frame to all access terminals that are actively associated (or registered) with the access point, the transmission frame includes a field adapted to instruct the associated access terminals to refrain from transmitting for a specified period of time, resulting in a temporary period of reduced contention on the transmission medium.

For example, the access point may send a first frame that is adapted to set a network allocation vector (NAV) at the associated access terminals, while being ignored by non-associated (or unregistered) access terminals and not recognized as setting a network allocation vector (NAV) by legacy access terminals. The associated access terminals that are adapted to receive and recognize the first frame setting the network allocation vector (NAV) may cease transmissions during the specified period, allowing non-associated (or unregistered) and/or legacy access terminals an opportunity to transmit to the access point.

According to another example, an access point may send a transmission frame including a field adapted to instruct the access terminals to refrain from transmitting for a specified period of time. The transmission frame may also include, or another transmission frame may be sent that includes, a partial-reset field adapted to indicate to the access terminals that they are allowed to transmit at least one type of transmission frame during the specified period of time. For example, the access point may send a first frame that is adapted to set a network allocation vector (NAV) at the plurality of access terminals, and a partial-reset frame that is adapted to partially reset the network allocation vector (NAV) for transmissions of the at least one type of allowed transmission frame. In this way, specific types of transmissions, such as transmissions relating to scanning and association, may be more easily transmitted by access terminals to the access point.

Exemplary Network Environments

FIG. 1 is a block diagram illustrating how one or more access terminals may operate within a wireless communication system. A wireless communication system 100 may include one or more access points 102 in wireless communication with one or more associated access terminals, such as a legacy access terminal (AT) 104 and/or a non-legacy access terminal 106. An associated access terminal comprises an access terminal that is registered with the particular access point 102 to gain full access to a network 108. It is noted that an access terminal typically associates with one access point at a time.

In addition to one or more associated access terminals, one or more non-associated (or unregistered) access terminals may be in wireless-communication range of the access point 102, such as the non-associated access terminal 110 and/or the non-associated legacy access terminal 112. To illustrate that the access terminal 110 and the legacy access terminal 112 are not actively associated with the access point 102, the arrows depicting wireless communications between the access point 102 and the access terminals 110, 112 are shown in broken lines. This is because, although the access terminals 110, 112 are not associated with the access point 102, they are still capable of communicating with the access point 102, for example to become associated (or registered) with the access point 102 for gaining full access to the network 108 through the access point 102.

Because multiple access terminals may be in wireless communication with a single access point 102 at any given time, the access point 102 and the various access terminals 104, 106, 110 and 112 may be adapted to support multiple-access technology. In at least one implementation, the access point 102 and the various access terminals 104, 106, 110 and 112 are adapted to operate in an IEEE 802.11 wireless local area network (WLAN).

In at least some instances, the associated access terminals 104, 106 may communicate transmissions with the access point 102 in the uplink direction (i.e., from the access terminal to the access point) using a shared uplink channel (or frequency band). In order to facilitate the plurality of associated access terminal 104, 106 sharing the uplink channel, the access point 102 may employ a multiple access sharing scheme, such as a priority-based channel access scheme in which the associated access terminals 104, 106 obtain transmission opportunities based on some form of priority to facilitate distributed channel access. For example, each associated access terminal 104, 106 may communicate in the uplink direction using designated uplink transmission opportunities obtained based on some form of priority (e.g., based on quality of service (QoS) requirements).

It may occur, that one or more non-associated access terminals 110, 112 may desire to communicate with the access point 102. For example, a non-associated access terminal 110, 112 may desire to become associated with the access point 102. However, as a non-associated access terminal, it may be unable to obtain a transmission opportunity amid the transmissions by the associated access terminals 104, 106. This may be especially true during periods of high traffic load. It may also occur that one or more legacy access terminals 104, 112 may desire to communicate with the access point 102, but may not be suitably configured to receive transmission opportunity assignments, and may be unable to obtain a transmission opportunity amid the transmissions by other access terminals.

In order to facilitate transmissions from non-associated access terminals and/or from legacy access terminals, the access point 102 is adapted to introduce one or more periods of reduced contention, allowing the non-associated and/or legacy access terminals to transmit frames more easily. According to a feature, the access point 102 may send a transmission including a frame that is adapted to instruct at least the associated access terminals to stop transmitting for a specified interval. During that specified interval, at least some of the associated access terminals may stop transmitting, resulting in temporarily reduced contention on the transmission channel and enabling the access terminals that did not stop transmitting an easier opportunity to transmit to the access point 102. For example, a non-associated access terminal 110 may more easily send one or more frames, such as a probe request frame, an authentication request frame and/or an association request frame to the access point 102.

According to various implementations, the access point 102 may introduce the one or more periods of temporarily reduced contention on the transmission channel by selectively setting a network allocation vector (NAV), selectively setting a longer backoff, selectively adding a fixed value to a backoff, or selectively setting an arbitration interframe space (AIFS) to a larger value until the AIFS has been exceeded and backoff countdown has resumed. Other similar means may also be implemented to introduce a period of reduced contention on the transmission channel.

It is noted that such contention reduction measures may be activated by the access point 102 by means of a transmission sent to one or more access terminals. However, such measures may also be repeatedly activated at a predefined timing schedule. The schedule and the particular contention reduction measure to take can be signaled to the access terminal upon association with the access point 102.

According to a feature, the reduced contention periods may be scheduled to occur according to a regular timetable to facilitate channel access for all the access terminals desiring to transmit on the transmission channel. For example, in at least one implementation, the reduced contention periods may be scheduled with a duty cycle of about 5%. That is, the access point 102 may manage the reduced contention periods so that contention is normal (i.e., unmodified or not reduced) for about 95% of the time, and reduced for about the remaining 5% of the time. The reduced contention periods may be scheduled to occur frequently enough to ensure that the time between reduced contention periods does not exceed a maximum latency requirement.

Figure 2:
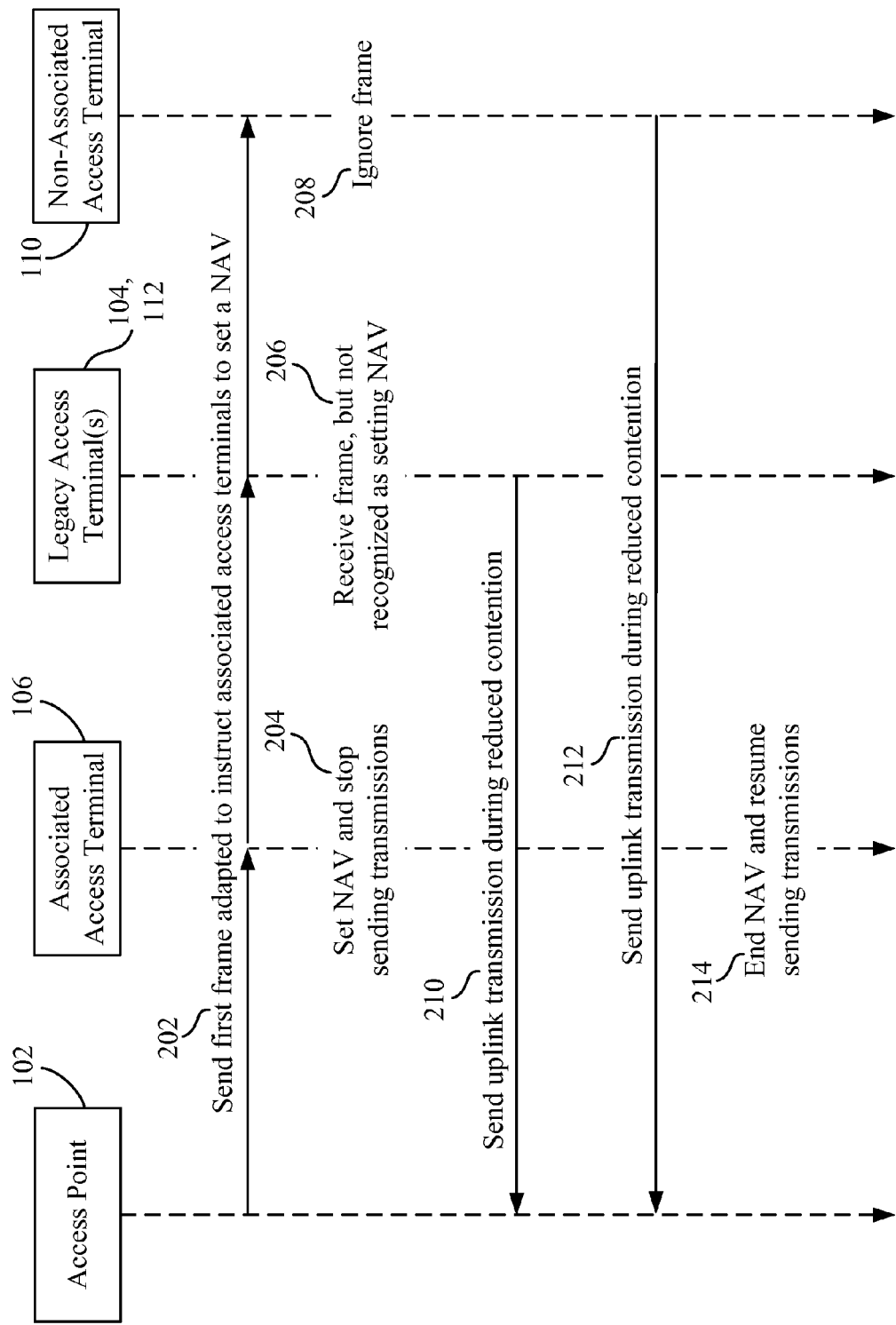
FIG. 2 is a flow diagram illustrating the operation of a wireless communication system where an access point facilitates management of one or more reduced contention periods using a network allocation vector (NAV) for associated access terminals.
Figure 3:
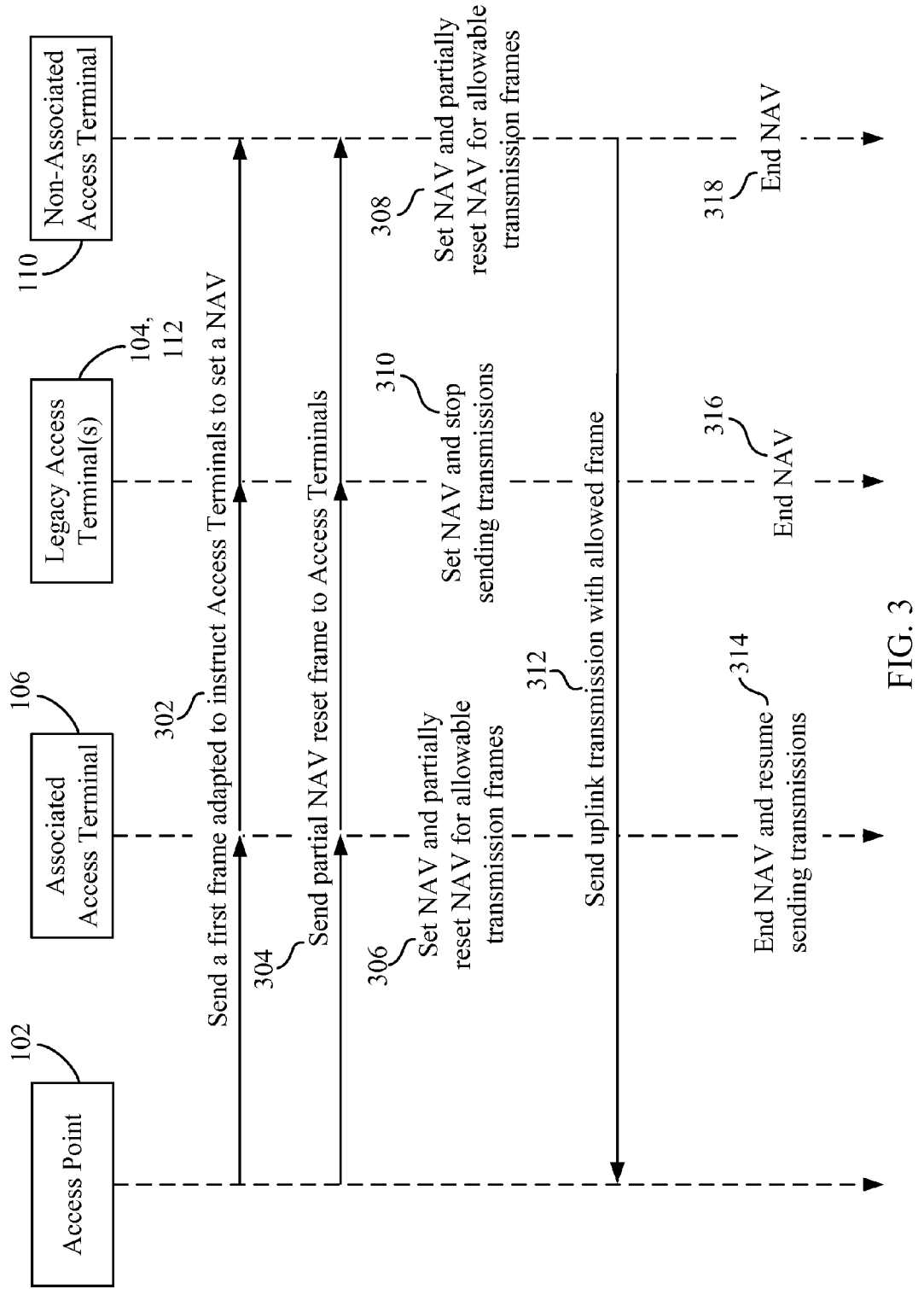
FIG. 3 is a flow diagram illustrating the operation of a wireless communication system where an access point facilitates management of one or more reduced contention periods using a network allocation vector (NAV) and a selective network allocation vector (NAV) reset.

FIGS. 2 and 3 show some examples of some implementations for employing one or more reduced contention periods using a network allocation vector (NAV).

Facilitating a Reduced Contention Period Using a Network Allocation Vector for Associated Access Terminals FIG. 2 is a flow diagram illustrating the operation of a wireless communication system where an access point facilitates management of one or more reduced contention periods using a network allocation vector (NAV) for associated access terminals. In this example, the access point 102, associated access terminal 106, legacy access terminals 104, 112 and non-associated access terminal 110 of FIG. 1 are used for illustration purposes. As indicated, the legacy access terminals are shown in a single group, whether associated or non-associated. It is noted that according to various implementations, there may be a plurality of one or more of the various classes of access terminals.

The access point 102 may initially communicate a downlink transmission that includes a frame adapted to instruct the associated access terminal 106 to stop transmitting for a specified period of time. For example, the access point 102 may transmit a first frame adapted to instruct any associated access terminals to set a network allocation vector (NAV) 202. Such a network allocation vector (NAV) to be set by associated access terminals may be referred herein as a "NAV for associated terminals," or a "NAT." Accordingly, the frame adapted to set a NAT may be referred to herein as a "NAT setting frame." The NAT setting frame may comprise a transmission frame that is adapted to be ignored by the non-associated access terminal 110, and that is not recognized as setting a network allocation vector (NAV) by the legacy access terminals 104, 112. In other words, the NAT setting frame may be adapted to be heeded only by associated access terminals, such as the associated access terminal 106. Some non-limiting examples of various implementations for suitable NAT setting frames are described herein below with reference to FIGS. 4 and 5.

The associated access terminal 106 may receive the sent NAT setting frame and may set a network allocation vector (NAV) for the duration specified by the NAT setting frame 204. By setting the network allocation vector (NAV), the associated access terminal 106 stops sending transmissions on the shared transmission channel for at least the specified time period. The legacy access terminals 104, 112 may receive the NAT setting frame, but do not recognize the frame configuration as setting a network allocation vector (NAV) 206. Furthermore, the non-associated access terminal 110 ignores the NAT setting frame 208. Accordingly, only the associated access terminal 106 has set a network allocation vector (NAV), causing the associated access terminal 106 to stop sending transmissions on the shared transmission channel, and reducing the contention for the shared transmission channel. In the case where there are several associated access terminals, the contention for the shared transmission channel may be substantially reduced during the network allocation vector (NAV) time period.

With the pause in transmissions by the associated access terminal(s) 106 resulting in reduced contention, the legacy access terminals 104, 112, whether associated or non-associated, may experience less contention and may more easily send uplink transmissions 210. Similarly, the non-associated access terminal 110 also experiences less contention and may more easily send uplink transmissions 212. For example, the non-associated access terminal 110 may transmit to the access point 102 at least one of a probe request frame, an authentication request frame, or an association request frame.

After the time period specified by the NAT setting frame has passed, the associated access terminal 106 may resume normal transmissions on the shared transmission channel 214, causing the contention to return to a normal level. In addition, however, one or more previously non-associated access terminals, such as non-associated access terminal 110 may have become associated during the reduced contention period and may now share the transmission channel as an associated access terminal According to at least some implementations, the NAT setting frame may be adapted to set a network allocation vector (NAV) at all receiving access terminals adapted to recognize the NAT setting frame as setting a network allocation vector (NAV), as opposed to just at the access terminals associated with the access point that sent the NAT setting frame. Such implementations may avoid any issues that may occur when two active networks are located in close proximity and only one network becomes at least substantially silent due to the NAT setting frame, while the other network continues to operate normally. In such a case, there continues to be no reduced contention period (or gap) during which a non-associated access terminal can establish an association with the access point that sent the NAT setting frame.

According to a feature, a network allocation vector set in response to a NAT setting frame may be reset using any conventional network allocation vector (NAV) resetting frame. For example, a contention-free end (CF-end) frame may be transmitted by the access point to reset the NAT.

As noted above, selectively setting a NAV is one example to temporarily reduce the contention on the medium. Other options include selectively setting a longer backoff, selectively adding a fixed value to a backoff, or selectively setting an arbitration interframe space (AIFS) to a larger value until the AIFS has been exceeded and backoff countdown has resumed.

Facilitating a Reduced Contention Period Using a NAV and a Selective NAV Reset

Turning to FIG. 3, another flow diagram is shown, illustrating the operation of a wireless communication system where an access point facilitates management of one or more reduced contention periods using a network allocation vector (NAV) and a selective network allocation vector (NAV) reset. In this example, the access point 102, associated access terminal 106, legacy access terminals 104, 112 and non-associated access terminal 110 of FIG. 1 are again used for illustration purposes. As indicated, the legacy access terminals are shown in a single group, whether associated or non-associated. It is noted that according to various implementations, there may be a plurality of one or more of the various types of access terminals.

The access point 102 may initially communicate a downlink transmission that includes a frame adapted to instruct the access terminals to stop transmitting for a specified period of time. In addition, another frame may be transmitted, either in the same downlink transmission or in another downlink transmission, to further instruct the access terminals to allow uplink transmissions of one or more select types of transmission frames during the specified period of time. For example, the access point 102 may transmit a first frame adapted to instruct the access terminals 106, 104, 112, 110 to set a network allocation vector (NAV) 302. Furthermore, the access point 102 may transmit a partial-reset frame adapted to instruct the access terminals to partially reset the network allocation vector (NAV) to allow the access terminals to transmit at least one type of transmission frame during the specified period of time 304. As noted, in some implementations, the first frame and the partial-reset frame may be separate transmission frames sent in separate downlink transmissions. In other embodiments, the first frame and the partial-reset frame may be integrated into the same transmission frame and sent in a single downlink transmission from the access point 102. A non-limiting example of an implementation for a suitable partial-reset frame is described herein below with reference to FIG. 6.

The associated access terminal 106 may receive the sent first frame and partial-reset frame and may set, and partially reset a network allocation vector (NAV) 306. Similarly, the non-associated access terminal 110 may receive the sent first frame and partial-reset frame, and may set and partially reset a network allocation vector (NAV) 308. By setting the network allocation vector (NAV), the associated access terminal 106 and the non-associated access terminal 110 stop sending transmissions in the uplink direction for the duration specified by the first frame that set the network allocation vector (NAV). By partially resetting the network allocation vector (NAV), the associated access terminal 106 and the non-associated access terminal 110 partially reset their network allocation vector (NAV) to allow the transmission of allowed transmission frames. By way of example and not limitation, the allowed transmission frames may include one or more of a probe request frame, an authentication request frame, or an association request frame.

The legacy access terminal(s) 104, 112 may receive the first frame to set the network allocation vector (NAV), but may not recognize the partial-reset frame, since they are legacy access terminals. Therefore, the legacy access terminal(s) 104, 112 may set the network allocation vector (NAV)

without partially resetting to allow transmissions of the allowed transmission frames 310.

With a network allocation vector (NAV) set at least partially, contention may be substantially reduced. Accordingly, those access terminals desiring to send transmission frames of the one or more types selectively allowed by the partial reset may experience less contention and may more easily send uplink transmissions. For example, a non-associated access terminal 110 desiring to communicate an allowed transmission frame, such as an association request frame, may send an uplink transmission to the access point 102 that includes the allowed transmission frame 312.

Figure 4:
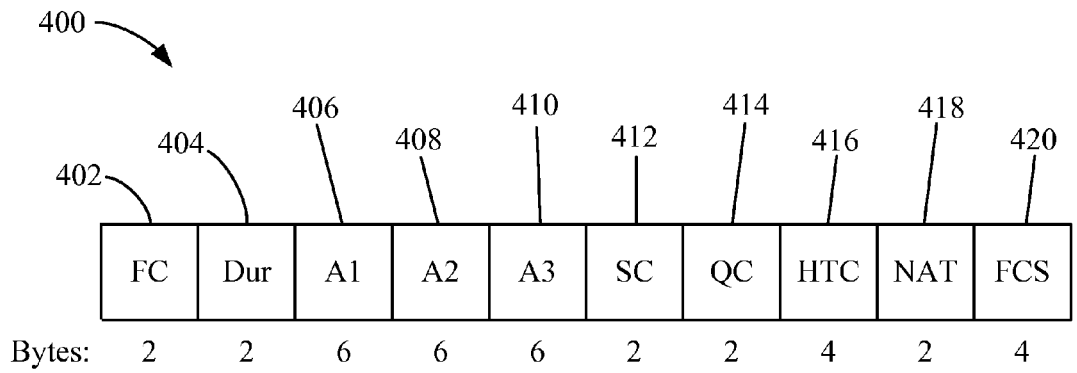
FIG. 4 is a block diagram illustrating an example of a transmission frame adapted for setting a network allocation vector at associated access terminals.

After the time period has passed, as specified by the first frame that set the network allocation vector (NAV), the various access terminals may end the network allocation vector (NAV) and resume normal transmissions. For example, the associated access terminal 106 may end the network allocation vector (NAV) and may resume sending transmissions, causing the contention to return to a normal (non-reduced) level 314. The legacy access terminals 104, 112, which in the described example set, but did not partially reset, the network allocation vector (NAV), may end the network allocation vector (NAV) and return to normal operations 316. Similarly, the non-associated access terminal 110 may end the network allocation vector (NAV) 318. However, the non-associated access terminal 110 may have used the reduced contention period to become associated and may now share the transmission channel as an associated access terminal Exemplary NAV for Associated Terminals (NAT) Setting Frames FIG. 4 is a block diagram illustrating an example of a transmission frame adapted for setting a network allocation vector (NAV) for associated access terminals (NAT). In this example, the transmission frame 400 may comprise a media access control (MAC) header that includes an extra field adapted to set a network allocation vector (NAV) at associated access terminals (NAT).

The transmission frame 400 may include a frame control (FC) field 402. The frame control field 402 may include one or more bits indicating that the frame type is a quality of service (QoS) null frame. A duration field 404 is included and may comprise a value that is less than the value inside the NAT field 418 described below. In some implementations, the duration field 404 may have a value of zero.

The transmission frame 400 further includes a plurality of address fields—A1, A2 and A3. The first address field (A1) 406 may indicate the broadcast address or the address of the intended receiver. The second address field (A2) 408 may indicate the ID of the sender (e.g., the ID of the access point). The third address field (A3) 410 may also include the sender's ID.

A sequence control (SC) field 412 may indicate a sequence number related to the transmission frame 400. The QoS control (QC) field 414 may be included to indicate the presence of a high throughput control (HTC) field 416. The HTC field may be implemented to include one or more bits for indicating to a receiving access terminal the presence of a NAV for associated terminals field (NAT field) 418. The NAT field 418 comprises an indication of the duration of a network allocation vector (NAV), and an indication that the network allocation vector is to be set only at associated access terminals. That is, the NAT field 418 includes one or more bits adapted to specify the time period of the network allocation vector (NAV) that is set at the associated access terminals. The transmission frame 400 may conclude with a conventional frame check sequence (FCS) field 420.

Upon receipt of the transmission frame 400 by an associated access terminal, the associated access terminal may identify the presence of the NAT field 418, and may be adapted to set a network allocation vector (NAV) for a time period specified by the NAT field 418, as described above with reference to FIG. 2.

Figure 5:
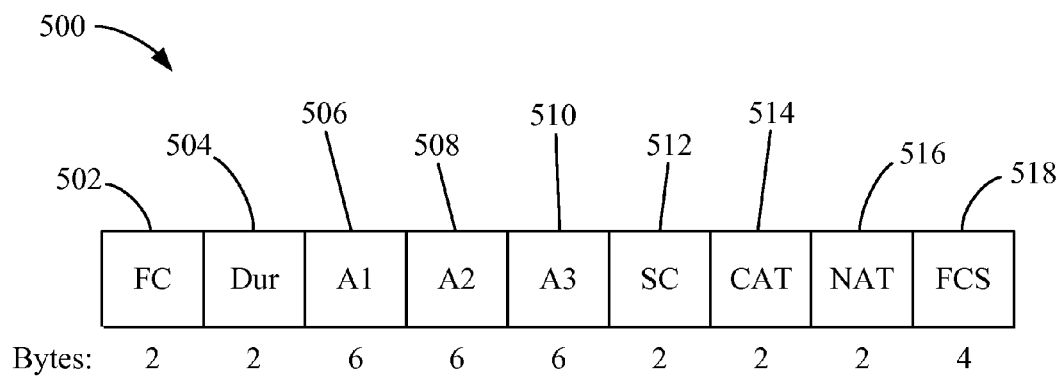
FIG. 5 is a block diagram illustrating another example of a transmission frame adapted for setting a network allocation vector at associated access terminals.

FIG. 5 is a block diagram illustrating another example of a transmission frame adapted for setting a network allocation vector (NAV) for associated access terminals (NAT). In the example transmission frame 500, the frame control (FC) field 502 is adapted to indicate that the transmission frame 500 is an action frame. Action frames comprise frames that are adapted to request an access terminal to take some action. An action frame typically includes a category field plus any required details for the particular category of actions. Such details typically vary depending on the type of category indicated by the category field.

Following the frame control field 502 is a duration field 504. The duration field 504 may comprise a value that is less than the value inside the NAT field 516. In some implementations, the duration field 504 may have a value of zero. The transmission frame 500 further includes the conventional address fields, A1 506, A2 508, and A3 510, implemented in a manner similar to the address fields described above with reference to FIG. 4. A sequence control (SC) field 512 may be included to indicate a sequence number related to the transmission frame 500.

As an action frame, the transmission frame 500 includes a category (CAT) field 514. The category field 514 is adapted to indicate that the action frame is of a category for setting a NAV at associated terminals (NAT). In the implementation shown in FIG. 5, the category for NAT frames may contain a NAV for associated terminals field (NAT field). Accordingly, the NAT field 516 may follow immediately after the category field 514. The NAT field 516 comprises an indication of the duration of a network allocation vector (NAV) for associated access terminals. That is, the NAT field 516 includes a plurality of bits adapted to specify the time period of the network allocation vector (NAV) that is set only at the associated access terminals. The transmission frame 500 may conclude with a conventional frame check sequence (FCS) field 518.

Upon receipt of the transmission frame 500 by an associated access terminal, the associated access terminal may identify the transmission frame 500 as an action frame of the category for NAT frames. The associated access terminal may then identify the NAT field 516 as indicating a time period to be set for a network allocation vector (NAV), as described above with reference to FIG. 2.

Although two examples of transmission frames are described for setting a network allocation vector (NAV) at associated access terminals, those of ordinary skill in the art will recognize that a number of other transmission frames may also be employed within the scope of this disclosure to achieve the same result of setting a network allocation vector (NAV) at associated access terminals. For example, in other implementations a new control frame may be employed including a NAT field for setting a network allocation vector (NAV) at associated access terminals. Many other options may also exist to design a transmission frame compatible with an IEEE 802.11 WLAN communications system that includes a NAT field for setting a network allocation vector (NAV) at associated access terminals.

Exemplary Partial NAV Reset Frame

Figure 6:
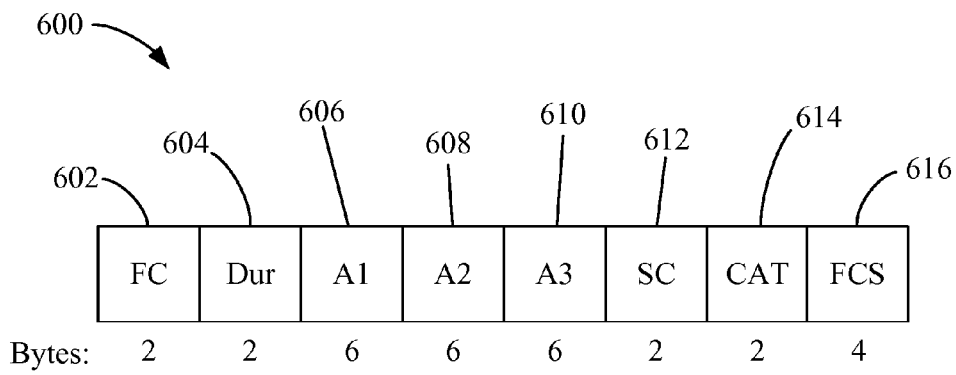
FIG. 6 is a block diagram illustrating an example of a transmission frame adapted for partially resetting a network allocation vector at an access terminal.

FIG. 6 is a block diagram illustrating an example of a transmission frame adapted for partially resetting a network allocation vector (NAV) at an access terminal, as described above with reference to FIG. 3. In this example, the transmission frame 600 may be implemented as an action frame of a category for partial NAV reset frames. Therefore, the frame control (FC) field 602 may include an indication that the transmission frame 600 is an action frame.

Following the frame control field 602 is a duration field 604. In implementations in which it is intended that the transmission frame 600 both set and partially reset a network allocation vector (NAV), the duration field 604 may include a value set to the intended duration of the reduced contention time period. That is, in implementations where the first frame and the partial-reset frame are integrated into a single transmission frame (i.e., they are the same transmission frame), as described herein, the duration field 604 may be employed to implement the first frame, and the category field 614 described below may be employed to implement the partial-reset frame. If a separate frame has already been sent to instruct the access terminals to set a network allocation vector (NAV), then the duration field 604 may be set to a value of zero.

The transmission frame 600 further includes the conventional address fields, A1 606, A2 608, and A3 610, implemented in a manner similar to the address fields described above with reference to FIG. 4. A sequence control (SC) field 612 may be included to indicate a sequence number related to the transmission frame 600.

As an action frame, the transmission frame 600 includes a category (CAT) field 614. The category field 614 is adapted to indicate that the action frame is of a category for partial NAV reset (PNR) frames. In the implementation shown in FIG. 5, the category for PNR frames may not include any further details, so no additional fields may follow the category field 614, except a conventional frame check sequence (FCS) field 616, which may conclude the transmission frame 600.

Upon receipt of the transmission frame 600 by an access terminal, the receiving access terminal may identify the transmission frame 600 as an action frame of the category for partial NAV reset frames. The associated access terminal may then allow transmissions of at least one type of transmission frame during a network allocation vector (NAV), as described above with reference to FIG. 3.

Although just one example of a transmission frame is described for resetting a network allocation vector (NAV), and for optionally setting the network allocation vector (NAV), at an access terminal, those of ordinary skill in the art will recognize that a number of other implementations may be employed to attach a partial NAV reset property to a transmission frame.

Exemplary Access Terminal

Figure 7:
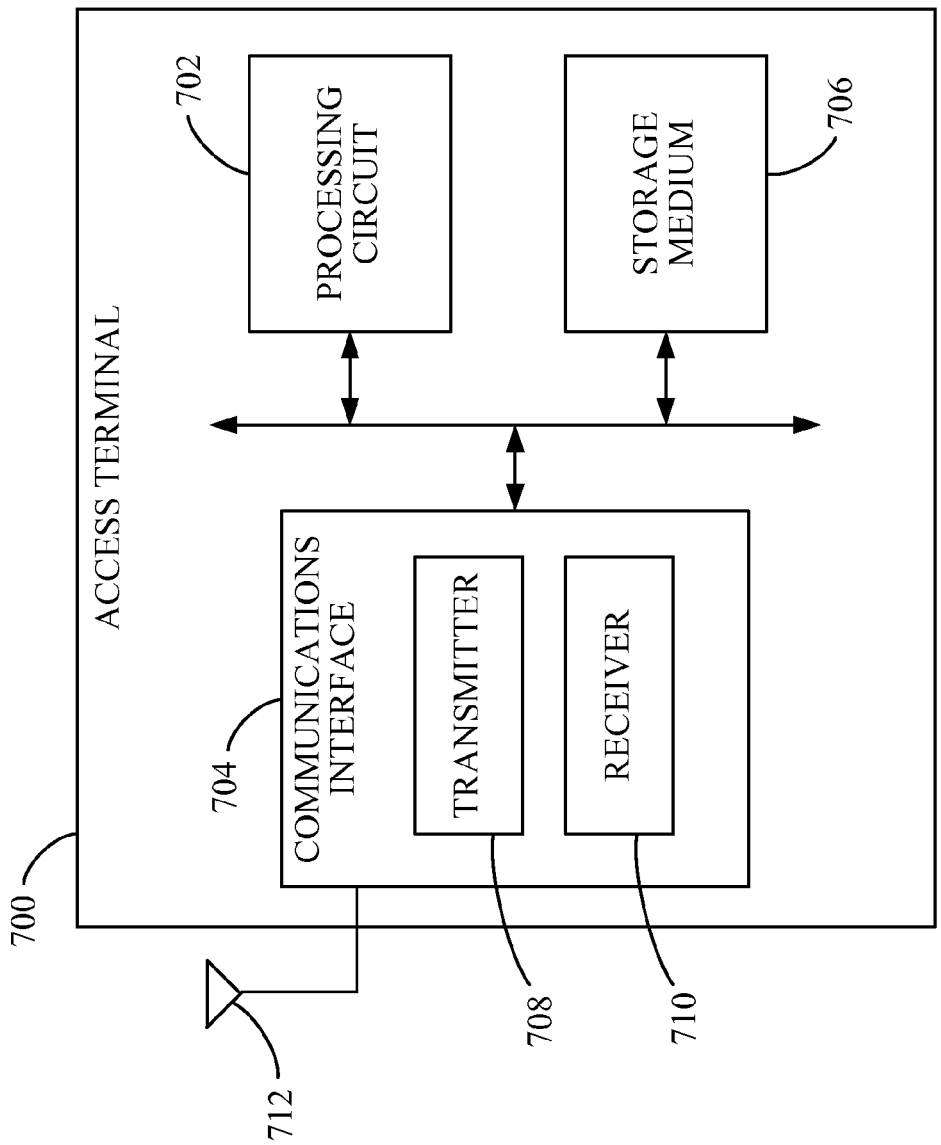
FIG. 7 is a block diagram illustrating select components of an access terminal according to at least one implementation.

FIG. 7 is a block diagram illustrating select components of an access terminal 700 according to at least one implementation. The access terminal 700 may include a processing circuit 702 coupled to a communications interface 704 and to a storage medium 706.

The processing circuit 702 is arranged to obtain, process and/or send data, control data access and storage, issue commands, and control other desired operations. The processing circuit 702 may comprise circuitry configured to implement desired programming provided by appropriate media in at least one embodiment. For example, the processing circuit 702 may be implemented as one or more of a processor, a controller, a plurality of processors and/or other structure configured to execute executable instructions including, for example, software and/or firmware instructions, and/or hardware circuitry. Embodiments of the processing circuit 702 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 702 are for illustration and other suitable configurations within the scope of the present disclosure are also contemplated.

The communications interface 704 is configured to facilitate wireless communications of the access terminal 700. The communications interface 704 may include at least one transmitter 708 and/or at least one receiver 710 (e.g., one or more transmitter/receiver chains). Furthermore, one or more antennas 712 may be electrically coupled to the communications interface 704. According to at least one implementation, the communications interface 704 may be adapted to facilitate wireless communications in an Institute of Electrical and Electronics Engineers (IEEE) 802.11 wireless local area network (WLAN).

The storage medium 706 may represent one or more devices for storing programming and/or data, such as processor executable code or instructions (e.g., software, firmware), electronic data, databases, or other digital information. The storage medium 706 may be any available media that can be accessed by a general purpose or special purpose processor. By way of example and not limitation, the storage medium 706 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 706 may be coupled to the processing circuit 702 such that the processing circuit 702 can read information from, and write information to, the storage medium 706. In the alternative, the storage medium 706 may be integral to the processing circuit 702.

According to one or more features of the access terminal 700, the processing circuit 702 may be adapted to perform any or all of the processes, functions, steps and/or routines related to the various access terminals as described herein above with reference to FIGS. 1-6 (e.g., access terminal 104, 106, 110 and/or 112). As used herein, the term "adapted" in relation to the processing circuit 702 may refer to the processing circuit 702 being one or more of configured, employed, implemented, or programmed to perform a particular process, function, step and/or routine according to various features.

Figure 8:
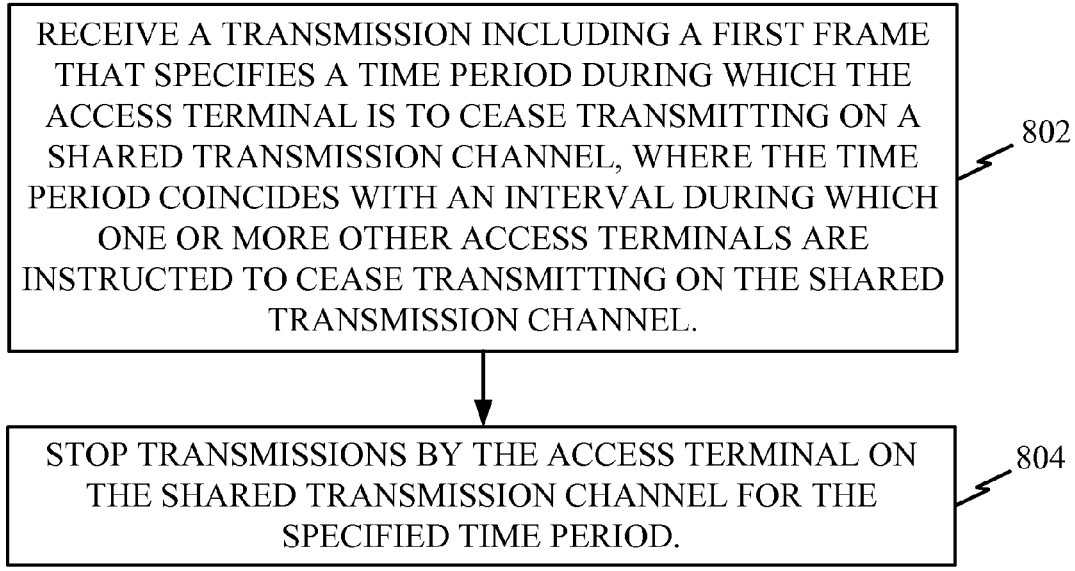
FIG. 8 is a flow diagram illustrating an example of at least one implementation of a method operational on an access terminal.

FIG. 8 is a flow diagram illustrating an example of at least one implementation of a method operational on an access terminal, such as the access terminal 700, for facilitating a temporary period of reduced contention on a shared transmission channel. With reference to both of FIGS. 7 and 8, a first transmission may be received at step 802. The first transmission may include a first frame that specifies a time period during which the access terminal 700 is to refrain from transmitting on a shared transmission channel. In order to create a reduced contention period, the time period can coincide with an interval during which one or more other access terminals are instructed to also refrain from transmitting on the shared transmission channel. For example, a downlink transmission including the first frame may be wirelessly transmitted by an access point, and may be received by the processing circuit 702 via the communications interface 704 of the access terminal 700.

The first frame can be adapted to instruct the access terminal 700 to set a network allocation vector (NAV) for the specified time period, to set a backoff for the specified time period, to add a fixed value to a backoff so that the combined time of the fixed value and the backoff is equal to the specified time period, or to set an arbitration interframe space (AIFS) to a value equal to the specified time period.

In implementations where the first frame is adapted to instruct the access terminal 700 to set a network allocation vector (NAV) for the specified time period, the processing circuit 702 may set the network allocation vector (NAV) for the specified time period to cause the access terminal 700 to stop transmitting on the shared transmission channel. According to some implementations, the access terminal 700 may be an associated access terminal, meaning that the access terminal 700 is actively associated with the access point that sent the downlink transmission. In such a case where the access terminal 700 is an associated access terminal, the first frame can include a network allocation vector (NAV) for associated access terminals field (NAT field) specifying the time period for the network allocation vector (NAV) to be set only at associated access terminals. According to various implementations, the NAT field may be included as an additional field in a media access control (MAC) header of the first frame. In other implementations, the first frame may comprise an action frame that includes a category filed indicating that the action frame is of a category that includes the NAT field.

Upon receipt of the first transmission, the access terminal 700 may stop, or refrain from, transmitting on the shared transmission channel for the specified period of time 804. For example, the processing circuit 702 may stop the communications interface 704 from sending any transmissions on the shared transmission channel for the duration of the specified time period.

Figure 9:
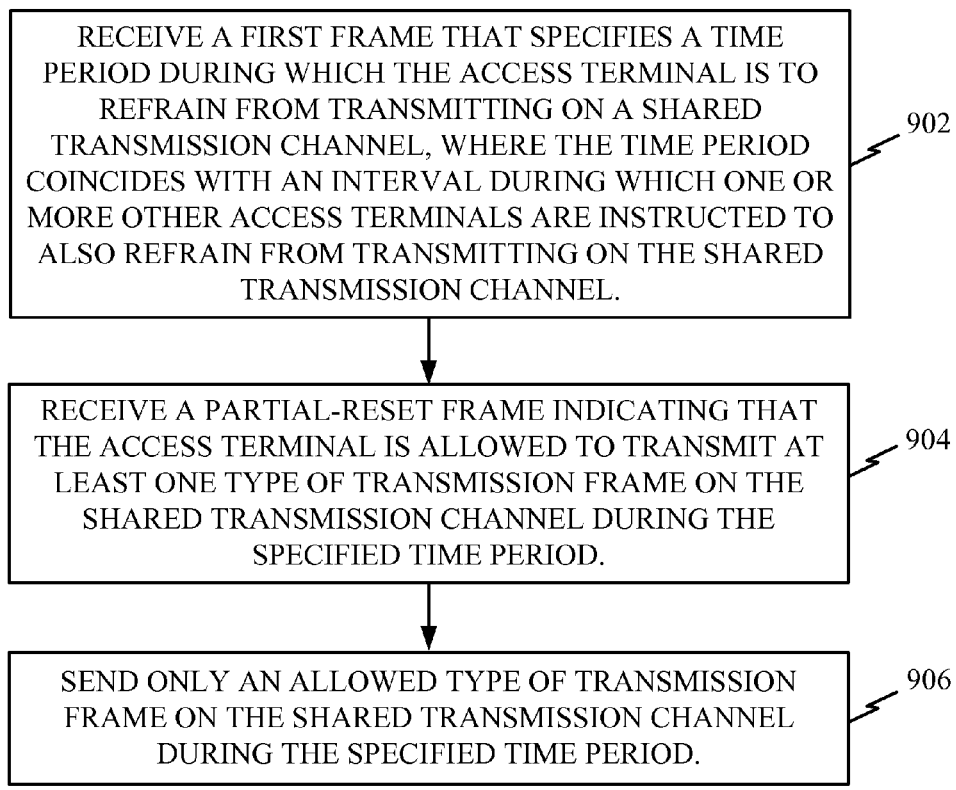
FIG. 9 is a flow diagram illustrating another example of at least one implementation of a method operational on an access terminal.

FIG. 9 is a flow diagram illustrating another example of at least one implementation of a method operational on an access terminal, such as the access terminal 700, for facilitating a temporary period of reduced contention on a shared transmission channel. With reference to both of FIGS. 7 and 9, a first transmission may be received including a first frame at step 902. The first frame specifies a time period during which the access terminal 700 is to refrain from transmitting on a shared transmission channel. In order to create a reduced contention period, the time period can coincide with an interval during which one or more other access terminals are instructed to also refrain from transmitting on the shared transmission channel. For example, a downlink transmission including the first frame may be wirelessly transmitted by an access point, and may be received by the processing circuit 702 via the communications interface 704 of the access terminal 700. The first frame can be adapted to instruct the access terminal 700 to set a network allocation vector (NAV) for the specified time period. For example, the first frame may include a duration field including a value indicating the specified time period.

The access terminal 700 may further receive a partial-reset frame before the expiration of the specified time period 904. The partial-reset frame can indicate that the access terminal 700 is allowed to transmit at least one type of transmission frame on the shared transmission channel during the specified time period. For example, the processing circuit 702 may receive, via the communications interface 704, the partial-reset frame. The partial-reset frame may be part of a transmission that is separate from the transmission including the first frame received at step 902, or the partial-reset frame may be received with the first frame. In some implementations, the partial-reset frame and the first frame are integrated into the same, single transmission frame. The partial-reset frame can be adapted to instruct the access terminal 700 to partially reset a network allocation vector (NAV) when the first frame is adapted to instruct the access terminal to set a network allocation vector (NAV).

After receiving the partial-reset frame at step 904, the access terminal may send a second transmission on the shared transmission channel during the specified time period, where the second transmission includes only an allowed type of transmission frame 906. For example, the processing circuit 702 may send an allowed type of transmission frame via the communications interface 704. In some implementations, the allowed type of transmission frame may include at least one of a probe request frame, an authentication request frame, or an association request frame. In implementations where the access terminal is a non-associated access terminal that is not actively registered with the access point that sent the first transmission, the processing circuit 702 may send one of these allowed types of transmission frames in order to become associated with the access point.

Exemplary Access Point

Figure 10:
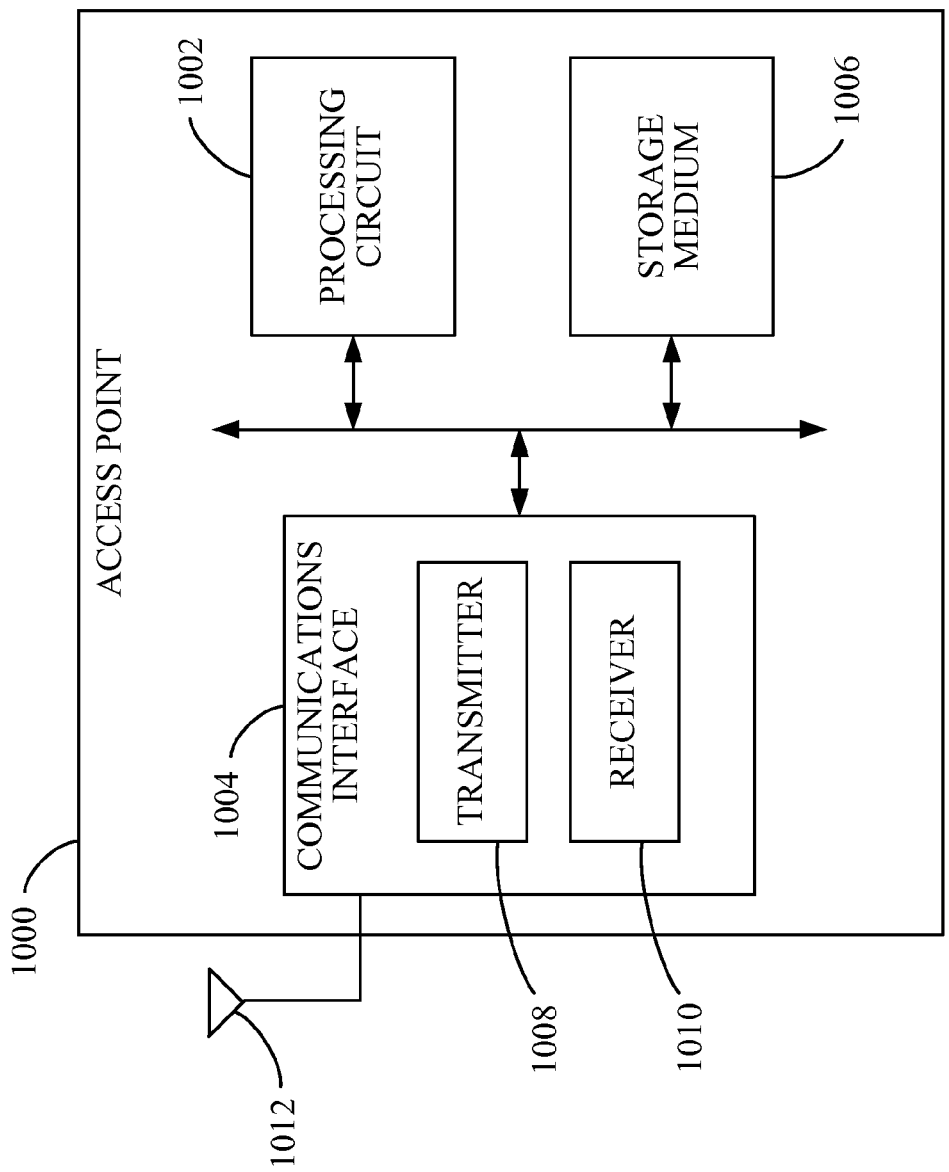
FIG. 10 is a block diagram illustrating select components of an access point according to at least one implementation.

FIG. 10 is a block diagram illustrating select components of an access point according to at least one implementation. As shown, an access point 1000 may include a processing circuit 1002 coupled to a communications interface 1004 and to a storage medium 1006.

The processing circuit 1002 is arranged to obtain, process and/or send data, control data access and storage, issue commands, and control other desired operations. The processing circuit 1002 may comprise circuitry configured to implement desired programming provided by appropriate media in at least one embodiment. For example, the processing circuit 1002 may be implemented as one or more of a processor, a controller, a plurality of processors and/or other structure configured to execute executable instructions including, for example, software and/or firmware instructions, and/or hardware circuitry. Embodiments of the processing circuit 1002 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 1002 are for illustration and other suitable configurations within the scope of the present disclosure are also contemplated.

The communications interface 1004 is configured to facilitate wireless communications of the access point 1000. The communications interface 1004 may include at least one transmitter 1008 and/or at least one receiver 1010 (e.g., one or more transmitter/receiver chains). Furthermore, one or more antennas 1012 may be electrically coupled to the communications interface 1004. According to at least one implementation, the communications interface 1004 may be adapted to facilitate wireless communications in an Institute of Electrical and Electronics Engineers (IEEE) 802.11 wireless local area network (WLAN).

The storage medium 1006 may represent one or more devices for storing programming and/or data, such as processor executable code or instructions (e.g., software, firmware), electronic data, databases, or other digital information. The storage medium 1006 may be any available media that can be accessed by a general purpose or special purpose processor. By way of example and not limitation, the storage medium 1006 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 1006 may be coupled to the processing circuit 1002 such that the processing circuit 1002 can read information from, and write information to, the storage medium 1006. In the alternative, the storage medium 1006 may be integral to the processing circuit 1002.

According to one or more features, the processing circuit 1002 may be adapted to perform any or all of the processes, functions, steps and/or routines related to the various access points as described herein above with reference to FIGS. 1-6 (e.g., access point 102). As used herein, the term "adapted" in relation to the processing circuit 1002 may refer to the processing circuit 1002 being one or more of configured, employed, implemented, or programmed to perform a particular process, function, step and/or routine according to various features.

Figure 11:
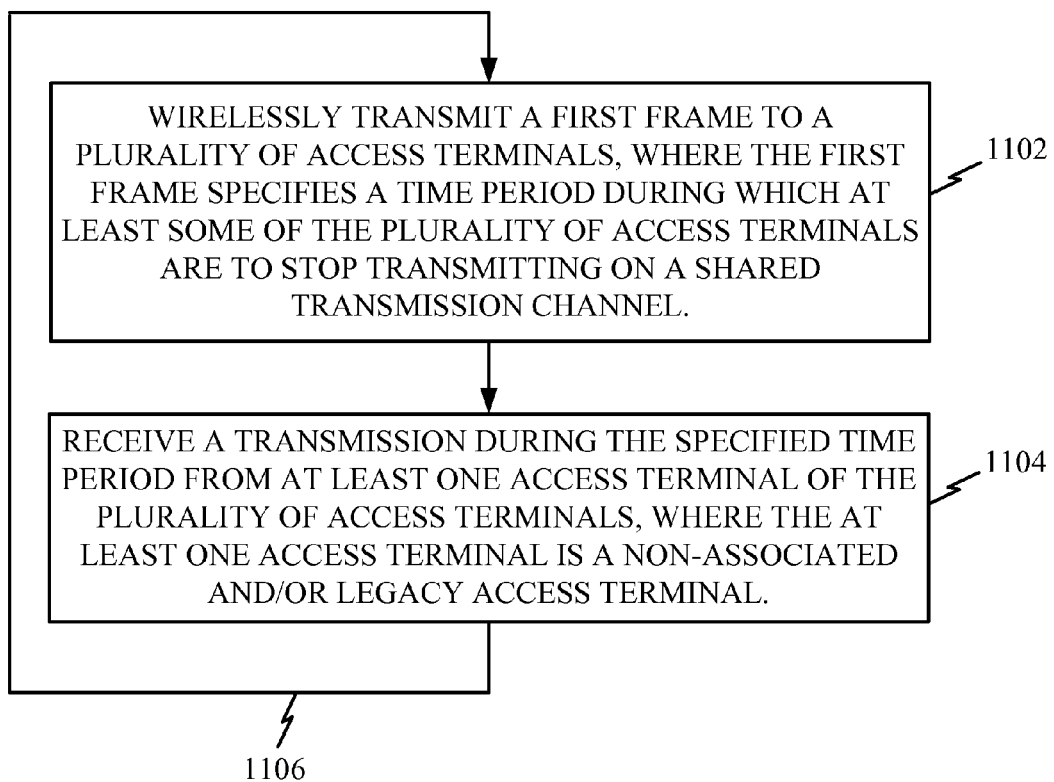
FIG. 11 is a flow diagram illustrating an example of at least one implementation of a method operational on an access point.

FIG. 11 is a flow diagram illustrating an example of at least one implementation of a method operational on an access point, such as access point 1000. With reference to both of FIGS. 10 and 11, the access point 1000 may wirelessly transmit a first frame to a plurality of access terminals 1102. The first frame may be configured to specify a time period during which at least some of the plurality of access terminals are to stop transmitting on a shared transmission channel. For example, the processing circuit 1002 may wirelessly transmit the first frame via the communications interface 1004.

According to a feature, the first frame can be configured to specify the time period by instructing at least some of the plurality of access terminals to set a network allocation vector (NAV) for a duration of the specified time period, to set a backoff for the specified time period, to add a fixed value to a backoff so that the combined time of the fixed value and the backoff is equal to the specified time period, or to set an arbitration interframe space (AIFS) to a value equal to the specified time period.

In some implementations where the first frame is configured to instruct at least some of the plurality of access terminals to set the network allocation vector (NAV), the first frame may include a NAV for associated access terminals field (a NAT field), where the NAT field specifies the time period for the network allocation vector (NAV) and indicates that the network allocation vector (NAV) is to be set only at associated access terminals. As noted above with reference to FIGS. 4 and 5, such a NAT field may be included as a field in the media access control (MAC) header of the first frame, or the first frame can comprise an action frame including a category field indicating that the action frame is of a category that includes the NAT field.

The access point 1000 further receives one or more transmissions during the specified time period from at least one access terminal 1104. For example, the processing circuit 1002 may receive the one or more transmissions via the communications interface 1004 from at least one access terminal. The one or more transmissions received during the specified time period may be transmitted by at least one access terminal that is a non-associated access terminal not actively registered with the access point 1000 and/or a legacy access terminal According to a feature, the access point 1000 may repeat the above method at periodic intervals, as illustrated by arrow 1106, to periodically introduce a reduced contention period on the shared transmission channel. Accordingly, the access point 100 will wirelessly transmit a plurality of first frames to a plurality of access terminals, where each first frame is wirelessly transmitted according to a periodic schedule. For example, the processing circuit 1002 may wirelessly transmit a plurality of first frame via the communications interface 1004, according to the periodic schedule.

Figure 12:
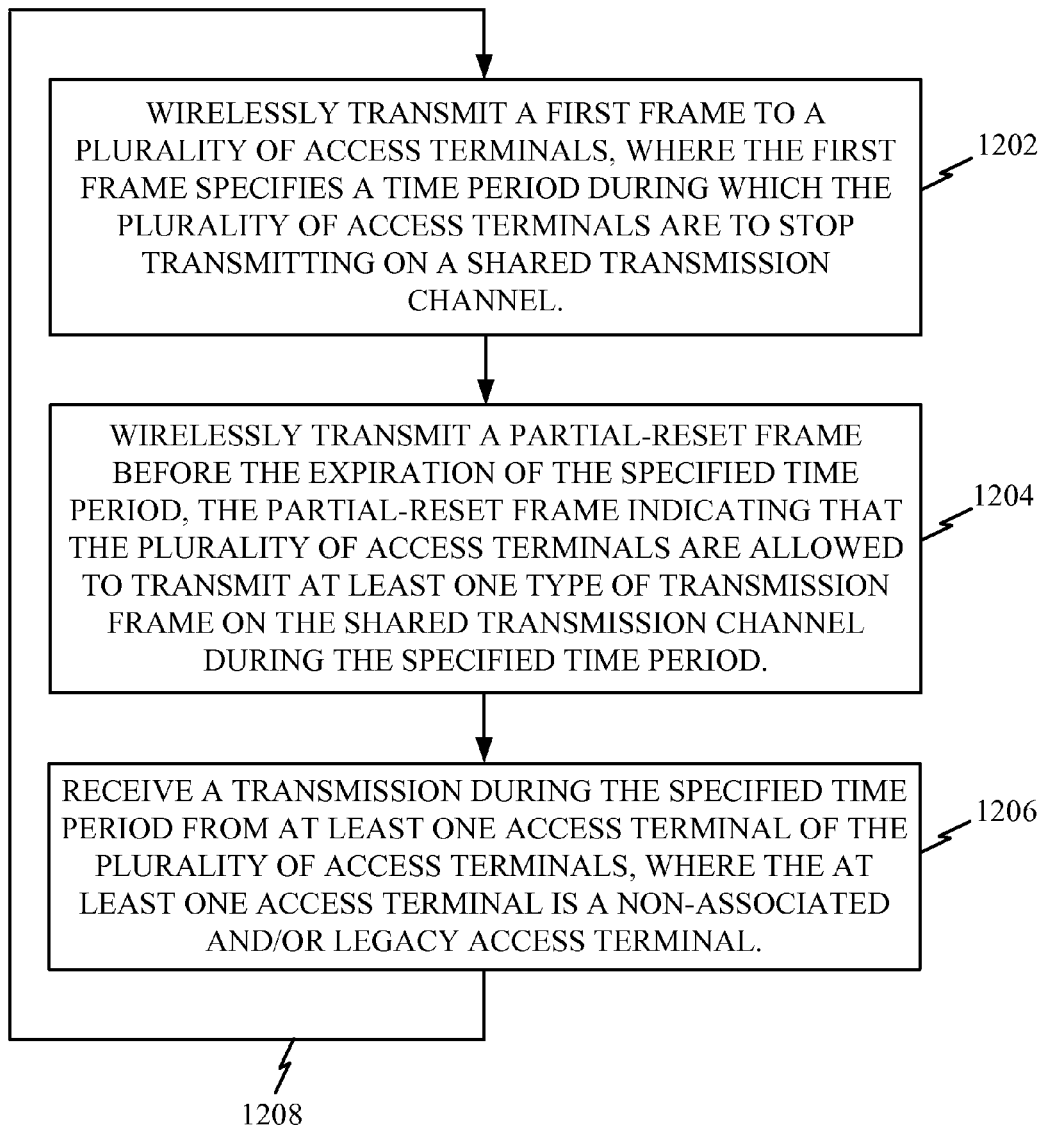
FIG. 12 is a flow diagram illustrating another example of at least one implementation of a method operational on an access point.

FIG. 12 is a flow diagram illustrating another example of at least one implementation of a method operational on an access point, such as access point 1000. With reference to both of FIGS. 10 and 12, the access point 1000 may wirelessly transmit a first frame to a plurality of access terminals 1202. The first frame may be configured to specify a time period during which the plurality of access terminals are to stop transmitting on a shared transmission channel. For example, the processing circuit 1002 may wirelessly transmit the first frame via the communications interface 1004.

The access point 1000 also wirelessly transmits a partial-reset frame before the expiration of the specified time period 1204. For example, the processing circuit 1002 may send a wireless transmission via the communications interface 1004 including the partial-reset frame. The partial-reset frame can be configured to indicate to the plurality of access terminals that they are allowed to transmit at least one type of transmission frame on the shared transmission channel during the specified time period. For example, the partial-reset frame may indicate that the plurality of access terminals are allowed to transmit probe request frames, authentication request frames, and/or association request frames.

In some implementations, the first frame is adapted to specify the time period by instructing the plurality of access terminals to set a network allocation vector (NAV) for a duration of the specified time period. In such implementations, the partial-reset frame can be adapted to instruct the plurality of access terminals to partially reset the network allocation vector (NAV) to allow transmissions of the at least one type of transmission frame during the specified time period of the network allocation vector (NAV). As noted above with reference to FIG. 6, the partial-reset frame can be configured to both set and partially reset the network allocation vector (NAV). In such implementations, the first frame and the partial reset frame comprise the same transmission frame.

The access point 1000 further receives one or more transmissions during the specified time period, where the one or more transmissions only include an allowed types of transmission frame 1206. For example, the processing circuit 1002 may receive a transmission via the communications interface 1004 from at least one access terminal. The one or more transmissions received during the specified time period may be transmitted by at least one access terminal that is a non-associated access terminal not actively registered with the access point 1000 and/or a legacy access terminal According to a feature, the access point 1000 may repeat the above method at periodic intervals, as indicated by arrow 1208, to periodically introduce a reduced contention period on the shared transmission channel. Accordingly, the access point will wirelessly transmit a plurality of first frames to a plurality of access terminals, where each first frame is wirelessly transmitted according to a periodic schedule. For example, the processing circuit 1002 may wirelessly transmit a plurality of first frame via the communications interface 1004, according to the periodic schedule.

One or more of the components, steps, features and/or functions illustrated in FIGS. 1, 2, 3, 4, 5, 6, 7, 8, 9 10, 11 and/or 12 may be rearranged and/or combined into a single component, step, feature or function or embodied in several components, steps, or functions. Additional elements, components, steps, and/or functions may also be added without departing from the invention. The apparatus, devices, components, and/or transmission frames illustrated in FIGS. 1, 4, 5, 6, 7 and/or 10 may be configured to perform one or more of the methods, features, or steps described in FIGS. 2, 3, 8, 9, 11 and/or 12. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An access terminal, comprising:
 a communications interface adapted to facilitate wireless communications; and
 a processing circuit coupled to the communications interface, the processing circuit adapted to:
 receive a first frame via the communications interface, the first frame specifying a time period during which the access terminal is to refrain from transmitting on a shared transmission channel, wherein the time period coincides with an interval during which associated access terminals are instructed to also refrain from transmitting on the shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
 stop transmitting on the shared transmission channel for the specified time period upon receipt of the first frame.

2. The access terminal of claim 1, wherein the first frame is adapted to specify the time period by instructing the access terminal to set the NAV for the specified time period, and the processing circuit is further adapted to:
 set the NAV for the specified time period to stop transmitting on the shared transmission channel upon receipt of the first frame.

3. The access terminal of claim 2, wherein:
 the access terminal is an associated access terminal that is actively registered with an access point that sent the first frame; and
 the NAT field further specifies the time period for the NAV.

4. The access terminal of claim 3, wherein the first frame comprises a media access control (MAC) header, and the NAT field is included as a field in the media access control (MAC) header.

5. The access terminal of claim 4, wherein a presence of the NAT field is indicated by a high throughput control (HTC) field in the media access control (MAC) header.

6. The access terminal of claim 3, wherein the first frame comprises an action frame including a category field indicating that the action frame is of a category that includes the NAT field.

7. The access terminal of claim 1, wherein:
the first frame is adapted to specify the time period by instructing the access terminal to:
set the NAV for the specified time period;
set a backoff for the specified time period; or
add a fixed value to a backoff to equal the specified time period.

8. A method operational on an access terminal, comprising:
receiving a first frame that specifies a time period during which the access terminal is to refrain from transmitting on a shared transmission channel, wherein the time period coincides with an interval during which associated access terminals are also instructed to refrain from transmitting on the shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
stopping transmissions by the access terminal on the shared transmission channel for the specified time period after receiving the first frame.

9. The method of claim 8, wherein:
receiving the first frame that specifies the time period during which the access terminal is to refrain from transmitting comprises receiving the first frame adapted to instruct the access terminal to set the NAV for the specified time period; and
ceasing from transmitting on the shared transmission channel for the specified time period comprises setting the NAV for the specified time period after receiving the first frame.

10. The method of claim 9, wherein receiving the first frame comprises:
receiving the first frame at the access terminal operating as an associated access terminal that is actively registered with an access point that sent the first frame, the NAT field further specifying the time period for the NAV.

11. The method of claim 10, wherein receiving the first frame comprises:
receiving the first frame including a media access control (MAC) header with the NAT field included as a field in the MAC header.

12. The method of claim 10, wherein receiving the first frame comprises:
receiving the first frame comprising an action frame including a category field indicating that the action frame is of a category that includes the NAT field.

13. The method of claim 8, wherein receiving the first frame that specifies the time period during which the access terminal is to refrain from transmitting comprises:
receiving the first frame that instructs the access terminal to:
set the NAV for the specified time period;
set a backoff for the specified time period;
add a fixed value to a backoff to equal the specified time period; or
set an arbitration interframe space (AIFS) to a value equal to the specified time period.

14. An access terminal, comprising:
means for receiving a first frame specifying a time period during which the access terminal is to refrain from transmitting on a shared transmission channel, wherein the time period coincides with an interval during which associated access terminals are instructed to refrain from transmitting on the shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
means for stopping transmissions by the access terminal on the shared transmission channel for the specified time period after receiving the first frame.

15. The access terminal of claim 14, wherein the first frame is adapted to specify the time period by instructing the access terminal to set a network allocation vector (NAV) for the specified time period.

16. The access terminal of claim 15, wherein:
the access terminal is an associated access terminal that is actively registered with an access point that sent the first frame; and
the NAT field further specifies the time period for the NAV.

17. A non-transitory processor readable medium comprising one or more instructions operational on an access terminal, which when executed by a processing circuit, causes the processing circuit to:
receive a first frame specifying a time period during which the access terminal is to refrain from transmitting on a shared transmission channel, wherein the time period coincides with an interval during which associated access terminals are instructed to refrain from transmitting on the shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
stop transmitting on the shared transmission channel for the specified time period upon receipt of the first frame.

18. The non-transitory processor readable medium of claim 17, wherein the first frame is adapted to specify the time period by instructing the access terminal to set the NAV for the specified time period.

19. The non-transitory processor readable medium of claim 18, wherein the NAT field further specifies the time period for the NAV.

20. An access terminal, comprising:
a communications interface adapted to facilitate wireless communications; and
a processing circuit coupled to the communications interface, the processing circuit adapted to:
receive a first frame via the communications interface, the first frame specifying a time period during which the access terminal is to refrain from transmitting on a shared transmission channel, wherein the time period coincides with an interval during which one or more other access terminals are instructed to also refrain from transmitting on the shared transmission channel, and wherein the time period is repeatedly activated according to a predefined timing schedule to not exceed a maximum latency requirement;

receive a partial-reset frame via the communications interface, the partial-reset frame indicating that the access terminal is allowed to transmit at least one type of transmission frame, but not all types of transmission frames, on the shared transmission channel during the specified time period, wherein the first frame and the partial-reset frame comprise a single integrated transmission frame; and send, via the communications interface, only an allowed type of transmission frame on the shared transmission channel during the specified time period.

21. The access terminal of claim 20, wherein the first frame is adapted to specify the time period by instructing the access terminal to set a network allocation vector (NAV) for the specified time period, and the processing circuit is adapted to:
set the NAV for the specified time period upon receipt of the first frame.

22. The access terminal of claim 21, wherein the partial-reset frame is adapted to instruct the access terminal to partially reset the NAV to allow transmissions of the at least one type of transmission frame during the specified time period, and the processing circuit is adapted to:
partially reset the NAV to allow transmissions of the at least one type of transmission frame during the specified time period.

23. The access terminal of claim 22, wherein the single integrated transmission frame is adapted to instruct the access terminal to both set and partially reset the NAV.

24. The access terminal of claim 20, wherein the at least one type of transmission frame that the access terminal is allowed to transmit on the shared transmission channel during the specified time period comprises at least one of a probe request frame, an authentication request frame, or an association request frame.

25. The access terminal of claim 24, wherein the access terminal is a non-associated access terminal that is not actively registered with an access point that sent the first frame, and the processing circuit is further adapted to:
send, via the communications interface, a transmission on the shared transmission channel during the specified time period, wherein the transmission includes one of a probe request frame, an authentication request frame, or an association request frame.

26. A method operational on an access terminal, comprising:
receiving a first frame specifying a time period during which the access terminal is to refrain from transmitting on a shared transmission channel, wherein the time period coincides with an interval during which one or more other access terminals are instructed to also refrain from transmitting on the shared transmission channel, and wherein the time period is repeatedly activated according to a predefined timing schedule to not exceed a maximum latency requirement;
receiving a partial-reset frame, the partial-reset frame indicating that the access terminal is allowed to transmit at least one type of transmission frame, but not all types of transmission frames, on the shared transmission channel during the specified time period, wherein the first frame and the partial-reset frame comprise a single integrated transmission frame; and
sending only an allowed type of transmission frame on the shared transmission channel during the specified time period.

27. The method of claim 26, wherein receiving the first frame specifying the time period during which the access terminal is to refrain from transmitting comprises:
receiving the first frame that instructs the access terminal to set a network allocation vector (NAV) for the specified time period; and
setting the NAV for the specified time period after receiving the first frame.

28. The method of claim 27, wherein receiving the partial-reset frame indicating that the access terminal is allowed to transmit at least one type of transmission frame on the shared transmission channel during the specified time period comprises:
receiving the partial-reset frame that instructs the access terminal to partially reset the NAV to allow transmissions of the at least one type of transmission frame during the specified time period; and
partially resetting the NAV to allow transmissions of the at least one type of transmission frame during the specified time period.

29. The method of claim 28, wherein the single integrated transmission frame is adapted to instruct the access terminal to both set and partially reset the NAV.

30. The method of claim 26, wherein the at least one type of transmission frame that the access terminal is allowed to transmit on the shared transmission channel during the specified time period comprises at least one of a probe request frame, an authentication request frame, or an association request frame.

31. The method of claim 30, wherein the access terminal is a non-associated access terminal that is not actively registered with an access point that sent the first frame, and further comprising:
sending a transmission on the shared transmission channel during the specified time period, wherein the transmission includes one of the probe request frame, the authentication request frame, or the association request frame.

32. An access terminal, comprising:
means for receiving a first frame specifying a time period during which the access terminal is to refrain from transmitting on a shared transmission channel, wherein the time period coincides with an interval during which one or more other access terminals are instructed to also refrain from transmitting on the shared transmission channel, and wherein the time period is repeatedly activated according to a predefined timing schedule to not exceed a maximum latency requirement;
means for receiving a partial-reset frame, the partial-reset frame indicating that the access terminal is allowed to transmit at least one type of transmission frame, but not all types of transmission frames, on the shared transmission channel during the specified time period, wherein the first frame and the partial-reset frame comprise a single integrated transmission frame; and
means for sending only an allowed type of transmission frame on the shared transmission channel during the specified time period.

33. The access terminal of claim 32, wherein the first frame is adapted to specify the time period by instructing the access terminal to set a network allocation vector (NAV) for the specified time period.

34. The access terminal of claim 33, wherein the partial-reset frame is adapted to instruct the access terminal to partially reset the NAV to allow transmissions of the at least one type of transmission frame during the specified time period.

35. The access terminal of claim 34, wherein the single integrated transmission frame is adapted to both set and partially reset the NAV.

36. A non-transitory processor readable medium comprising one or more instructions operational on an access terminal, which when executed by a processing circuit, causes the processing circuit to:
receive a first frame specifying a time period during which the access terminal is to refrain from transmitting on a shared transmission channel, wherein the time period coincides with an interval during which one or more other access terminals are instructed to also refrain from transmitting on the shared transmission channel, and wherein the time period is repeatedly activated according to a predefined timing schedule to not exceed a maximum latency requirement;
receive a partial-reset frame, the partial-reset frame indicating that the access terminal is allowed to transmit at least one type of transmission frame, but not all types of transmission frames, on the shared transmission channel during the specified time period, wherein the first frame and the partial-reset frame comprise a single integrated transmission frame; and
send only an allowed type of transmission frame on the shared transmission channel during the specified time period.

37. The non-transitory processor readable medium of claim 36, wherein the first frame is adapted to specify the time period by instructing the access terminal to set a network allocation vector (NAV) for the specified time period.

38. The non-transitory processor readable medium of claim 37, wherein the partial-reset frame is adapted to instruct the access terminal to partially reset the NAV to allow transmissions of the at least one type of transmission frame during the specified time period.

39. The non-transitory processor readable medium of claim 38, wherein the single integrated transmission frame is adapted to both set and partially reset the NAV.

40. An access point, comprising:
a communications interface adapted to facilitate wireless communications; and
a processing circuit coupled to the communications interface, the processing circuit adapted to:
wirelessly transmit a first frame via the communications interface to a plurality of access terminals, the first frame specifying a time period during which associated access terminals are to stop transmitting on a shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
receive, via the communications interface, a transmission during the specified time period from at least one of a non-associated access terminal or a legacy access terminal.

41. The access point of claim 40, wherein the first frame is adapted to specify the time period by instructing at least some of the plurality of access terminals to:
set the NAV for the specified time period;
set a backoff for the specified time period; or
add a fixed value to a backoff so the combination equals the specified time period.

42. The access point of claim 41, wherein:
the first frame is adapted to specify the time period by instructing at least some of the plurality of access terminals to set the NAV for a duration of the specified time period; and
the NAT field further specifying the time period for the NAV.

43. The access point of claim 42, wherein the first frame comprises a media access control (MAC) header, and the NAT field is included as a field in the MAC header.

44. The access point of claim 43, wherein a presence of the NAT field is indicated by a high throughput control (HTC) field in the MAC header.

45. The access point of claim 42, wherein the first frame comprises an action frame including a category field indicating that the action frame is of a category that includes the NAT field.

46. The access point of claim 40, wherein the processing circuit is further adapted to:
wirelessly transmit a plurality of first frames via the communications interface to a plurality of access terminals, wherein each first frame of the plurality of first frames is wirelessly transmitted according to a periodic schedule.

47. A method operational on an access point, comprising:
wirelessly transmitting a first frame to a plurality of access terminals, the first frame specifying a time period during which associated access terminals are to stop transmitting on a shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
receiving a transmission during the specified time period from at least one access terminal of the plurality of access terminals, wherein the at least one access terminal comprises a non-associated access terminal or a legacy access terminal.

48. The method of claim 47, wherein wirelessly transmitting the first frame specifying the time period during which at least some of the plurality of access terminals are to stop transmitting on the shared transmission channel comprises:
wirelessly transmitting the first frame adapted to instruct at least some of the plurality of access terminals to set the NAV for a duration of the specified time period.

49. The method of claim 48, wherein wirelessly transmitting the first frame adapted to instruct at least some of the plurality of access terminals to set the NAV for the duration of the specified time period comprises:
wirelessly transmitting the first frame including the NAT field, the NAT field further specifying the time period for the NAV.

50. The method of claim 49, wherein wirelessly transmitting the first frame including the NAT field comprises:
wirelessly transmitting the first frame including the NAT field incorporated into a media access control (MAC) header.

51. The method of claim 49, wherein wirelessly transmitting the first frame including the NAT field comprises:

wirelessly transmitting the first frame as an action frame including a category field indicating that the action frame is of a category that includes the NAT field.

52. The method of claim 47, wherein wirelessly transmitting the first frame specifying the time period during which at least some of the plurality of access terminals are to stop transmitting on the shared transmission channel comprises:
wirelessly transmitting the first frame adapted to instruct at least some of the plurality of access terminals to:
set the NAV for a duration of the specified time period;
set a backoff for the specified time period;
add a fixed value to a backoff so the combination equals the specified time period; or
set an arbitration interframe space (AIFS) to a value equal to the specified time period.

53. The method of claim 47, further comprising:
wirelessly transmitting a plurality of first frames to a plurality of access terminals, wherein each first frame of the plurality of first frames is wirelessly transmitted according to a periodic schedule.

54. An access point, comprising:
means for wirelessly transmitting a first frame to a plurality of access terminals, the first frame specifying a time period during which associated access terminals are to stop transmitting on a shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
means for receiving a transmission during the specified time period from at least one access terminal of the plurality of access terminals, wherein the at least one access terminal comprises a non-associated access terminal or a legacy access terminal.

55. The access point of claim 54, wherein the first frame is adapted to specify the time period by instructing at least some of the plurality of access terminals to set the NAV for a duration of the specified time period.

56. The access point of claim 55, wherein the NAT field further specifies the time period for the NAV.

57. A non-transitory processor readable medium comprising one or more instructions operational on an access point, which when executed by a processing circuit, causes the processing circuit to:
wirelessly transmit a first frame to a plurality of access terminals, the first frame specifying a time period during which associated access terminals are to stop transmitting on a shared transmission channel and legacy and non-associated access terminals are permitted to transmit on the shared transmission channel, wherein the first frame includes a network allocation vector for associated access terminals field (NAT field) indicating that a network allocation vector (NAV) is to be set only at associated access terminals, and wherein the time period is repeatedly activated according to a predefined timing schedule to not exceed a maximum latency requirement; and
receive a transmission during the specified time period from at least one of a non-associated access terminal or a legacy access terminal.

58. The non-transitory processor readable medium of claim 57, wherein the first frame is adapted to specify the time period by instructing at least some of the plurality of access terminals to set the NAV for a duration of the specified time period.

59. The non-transitory processor readable medium of claim 58, wherein the NAT field further specifies the time period for the NAV.

60. An access point, comprising:
a communications interface adapted to facilitate wireless communications; and
a processing circuit coupled to the communications interface, the processing circuit adapted to:
wirelessly transmit a first frame via the communications interface to a plurality of access terminals, the first frame specifying a time period during which the plurality of access terminals are to stop transmitting on a shared transmission channel, wherein the time period is repeatedly activated according to a predefined timing schedule to not exceed a maximum latency requirement;
wirelessly transmit a partial-reset frame, the partial-reset frame indicating that the plurality of access terminals are allowed to transmit at least one type of transmission frame, but not all types of transmission frames, on the shared transmission channel during the specified time period, wherein the first frame and the partial-reset frame comprise a single integrated transmission frame; and
receive, via the communications interface, at least one transmission during the specified time period, the at least one transmission including only an allowed type of transmission frame.

61. The access point of claim 60, wherein the first frame is adapted to specify the time period by instructing the plurality of access terminals to set a network allocation vector (NAV) for a duration of the specified time period.

62. The access point of claim 61, wherein the partial-reset frame is adapted to instruct the plurality of access terminals to partially reset the NAV to allow transmissions of the at least one type of transmission frame during the specified time period.

63. The access point of claim 62, wherein the single integrated transmission frame is adapted to both set and partially reset the NAV.

64. The access point of claim 60, wherein the at least one type of transmission frame that the plurality of access terminals are allowed to transmit on the shared transmission channel during the specified time period comprises at least one of a probe request frame, an authentication request frame, or an association request frame.

65. The access point of claim 60, wherein the processing circuit is further adapted to:
wirelessly transmit a plurality of sets via the communications interface to a plurality of access terminals, each set including a first frame and partial-reset frame, wherein each set is wirelessly transmitted according to a periodic schedule.

66. A method operational on an access point, comprising:
wirelessly transmitting a first frame to a plurality of access terminals, the first frame specifying a time period during which the plurality of access terminals are to stop transmitting on a shared transmission channel, wherein the time period is repeatedly activated according to a predefined timing schedule to not exceed a maximum latency requirement;
wirelessly transmitting a partial-reset frame, the partial-reset frame indicating that the plurality of access terminals are allowed to transmit at least one type of transmission frame, but not all types of transmission frames, on the shared transmission channel during the specified time period, wherein the first frame and the partial-reset frame comprise a single integrated transmission frame; and receiving at least one transmission during the specified time period, the at least one transmission including only an allowed type of transmission frame.

67. The method of claim 66, wherein wirelessly transmitting the first frame specifying the time period during which the plurality of access terminals are to stop transmitting on the shared transmission channel comprises:

wirelessly transmitting the first frame adapted to instruct the plurality of access terminals to set a network allocation vector (NAV) for a duration of the specified time period.

68. The method of claim 67, wherein wirelessly transmitting the partial-reset frame indicating that the plurality of access terminals are allowed to transmit the at least one type of transmission frame on the shared transmission channel during the specified time period comprises:

wirelessly transmitting the partial-reset frame adapted to instruct the plurality of access terminals to partially reset the NAV to allow transmissions of the at least one type of transmission frame during the specified time period.

69. The method of claim 68, wherein the single integrated transmission frame is adapted to both set and partially reset the NAV.

70. The method of claim 66, wherein the at least one type of transmission frame that the plurality of access terminals are allowed to transmit on the shared transmission channel during the specified time period comprises at least one of a probe request frame, an authentication request frame, or an association request frame.

71. The method of claim 66, further comprising:

wirelessly transmitting a plurality of sets to a plurality of access terminals, each set including a first frame and partial-reset frame, wherein each set is wirelessly transmitted according to a periodic schedule.

72. An access point, comprising:

means for wirelessly transmitting a first frame to a plurality of access terminals, the first frame specifying a time period during which the plurality of access terminals are to stop transmitting on a shared transmission channel, wherein the time period is repeatedly activated according to a predefined timing schedule to not exceed a maximum latency requirement;

means for wirelessly transmitting a partial-reset frame, the partial-reset frame indicating that the plurality of access terminals are allowed to transmit at least one type of transmission frame, but not all types of transmission frames, on the shared transmission channel during the specified time period, wherein the first frame and the partial-reset frame comprise a single integrated transmission frame; and means for receiving at least one transmission during the specified time period, the at least one transmission including only an allowed type of transmission frame.

73. The access point of claim 72, wherein the first frame is adapted to specify the time period by instructing the plurality of access terminals to set a network allocation vector (NAV) for a duration of the specified time period.

74. The access point of claim 73, wherein the partial-reset frame is adapted to instruct the plurality of access terminals to partially reset the NAV to allow transmissions of the at least one type of transmission frame during the specified time period.

75. The access point of claim 74, wherein the single integrated transmission frame is adapted to both set and partially reset the NAV.

76. A non-transitory processor readable medium comprising one or more instructions operational on an access point, which when executed by a processing circuit, causes the processing circuit to:

wirelessly transmit a first frame to a plurality of access terminals, the first frame specifying a time period during which the plurality of access terminals are to stop transmitting on a shared transmission channel, wherein the time period is repeatedly activated according to a predefined timing schedule to not exceed a maximum latency requirement;

wirelessly transmit a partial-reset frame, the partial-reset frame indicating that the plurality of access terminals are allowed to transmit at least one type of transmission frame, but not all types of transmission frames, on the shared transmission channel during the specified time period, wherein the first frame and the partial-reset frame comprise a single integrated transmission frame; and receive at least one transmission during the specified time period, the at least one transmission including only an allowed type of transmission frame.

77. The non-transitory processor readable medium of claim 76, wherein the first frame is adapted to specify the time period by instructing the plurality of access terminals to set a network allocation vector (NAV) for a duration of the specified time period.

78. The non-transitory processor readable medium of claim 77, wherein the partial-reset frame is adapted to instruct the plurality of access terminals to partially reset the NAV to allow transmissions of the at least one type of transmission frame during the specified time period.

79. The non-transitory processor readable medium of claim 78, wherein the single integrated transmission frame is adapted to both set and partially reset the NAV.

80. The access terminal of claim 1, wherein the first frame is adapted to specify the time period by instructing the access terminal to set an arbitration interframe space (AIFS) to a value equal to the specified time period.

81. The access point of claim 40, wherein the first frame is adapted to specify the time period by instructing at least some of the plurality of access terminals to set an arbitration interframe space (AIFS) to a value equal to the specified time period.

82. The access terminal of claim 1, wherein the time period is repeatedly activated according to the predefined timing schedule with a duty cycle of 5%.

* * * * *